(12) United States Patent
Cottrell et al.

(10) Patent No.: US 8,256,750 B2
(45) Date of Patent: Sep. 4, 2012

(54) VIBRATION ISOLATION MOUNTING ASSEMBLY

(75) Inventors: Brian Cottrell, Litchfield Park, AZ (US); Porter Davis, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 865 days.

(21) Appl. No.: 12/388,338

(22) Filed: Feb. 18, 2009

(65) Prior Publication Data

US 2010/0207007 A1  Aug. 19, 2010

(51) Int. Cl.
  *F16F 7/10* (2006.01)
  *F16F 9/04* (2006.01)
(52) U.S. Cl. ........... 267/136; 188/298; 188/379; 384/99
(58) Field of Classification Search .................. 188/298, 188/378–379; 267/136; 248/550, 638; 384/99, 384/536
  See application file for complete search history.

(56) References Cited

U.S. PATENT DOCUMENTS

| | | | |
|---|---|---|---|
| 2,473,267 A * | 6/1949 | Wightman | ..................... 384/536 |
| 3,462,136 A * | 8/1969 | Rumsey | ........................ 267/136 |
| 3,613,457 A | 10/1971 | Davis et al. | |
| 3,980,358 A | 9/1976 | Davis | |
| 4,705,410 A | 11/1987 | Von Broock | |
| 4,743,125 A | 5/1988 | Dammel et al. | |
| 4,760,996 A | 8/1988 | Davis | |
| 4,781,363 A | 11/1988 | Braun | |
| 4,793,722 A | 12/1988 | Jensen | |
| 4,811,919 A | 3/1989 | Jones | |
| 4,848,525 A | 7/1989 | Jacot et al. | |
| 4,872,767 A | 10/1989 | Knapp | |
| 4,893,798 A | 1/1990 | Hibi et al. | |
| 4,952,076 A | 8/1990 | Wiley, III et al. | |
| 4,971,456 A | 11/1990 | Hori | |
| 4,971,458 A | 11/1990 | Carlson | |
| 5,004,215 A | 4/1991 | Aubry et al. | |
| 5,044,781 A * | 9/1991 | Werner | ........................... 384/99 |
| 5,176,339 A | 1/1993 | Schmidt | |
| 5,201,585 A | 4/1993 | Gans et al. | |
| 5,219,051 A | 6/1993 | Davis | |
| 5,244,170 A | 9/1993 | Shekher | |
| 5,249,783 A | 10/1993 | Davis | |
| 5,305,981 A | 4/1994 | Cunningham et al. | |
| 5,318,156 A | 6/1994 | Davis | |
| 5,332,070 A | 7/1994 | Davis et al. | |
| 5,344,239 A * | 9/1994 | Stallone et al. | .................. 384/99 |
| 5,421,655 A * | 6/1995 | Ide et al. | .......................... 384/99 |
| 5,425,584 A | 6/1995 | Ide | |
| 5,531,522 A | 7/1996 | Ide et al. | |
| 5,603,574 A | 2/1997 | Ide et al. | |
| 5,613,781 A | 3/1997 | Kuzdzal et al. | |

(Continued)

*Primary Examiner* — Christopher Schwartz
(74) *Attorney, Agent, or Firm* — Ingrassia Fisher & Lorenz, P.C.

(57) ABSTRACT

A mounting assembly is provided. The mounting assembly comprises an outer ring having a plurality of insert portions, each of the plurality of insert portions extending toward the center of the outer ring and having an insert cavity, a plurality of vibration isolation assemblies, each of the vibration isolation assemblies disposed in one of the insert cavities, each of the plurality of vibration isolation assemblies comprising a first bellows portion and a second bellows portion, a passageway formed therein and connecting the first and second bellows portions, and a contact portion adapted to receive a force, an inner ring having a plurality of contact cavities, each contact cavity adapted to receive a contact portion from one of the plurality of vibration isolation assemblies, and a central ring coupled to the outer ring by the plurality of insert portions, and to the inner ring by a plurality of bridge portions.

15 Claims, 8 Drawing Sheets

U.S. PATENT DOCUMENTS

| | | | | |
|---|---|---|---|---|
| 5,738,445 | A | 4/1998 | Gardner | |
| 5,762,295 | A | 6/1998 | McGuire et al. | |
| 5,775,472 | A | 7/1998 | Osterberg et al. | |
| 5,797,684 | A | 8/1998 | Becker | |
| 5,803,213 | A | 9/1998 | Davis et al. | |
| 5,803,612 | A | 9/1998 | Battig | |
| 5,810,319 | A | 9/1998 | Von Flotow et al. | |
| 5,816,373 | A | 10/1998 | Osterberg et al. | |
| 5,873,438 | A | 2/1999 | Osterberg et al. | |
| 5,918,865 | A | 7/1999 | Osterberg | |
| 5,947,240 | A | 9/1999 | Davis et al. | |
| 5,947,457 | A | 9/1999 | Swanson et al. | |
| 5,957,440 | A | 9/1999 | Jones et al. | |
| 5,979,882 | A | 11/1999 | Osterberg | |
| 6,003,849 | A * | 12/1999 | Davis et al. | 267/140.14 |
| 6,036,182 | A | 3/2000 | Okanaka | |
| 6,065,741 | A | 5/2000 | Davis et al. | |
| 6,082,508 | A | 7/2000 | Davis | |
| 6,099,165 | A | 8/2000 | Tremaine | |
| 6,109,791 | A | 8/2000 | Metton et al. | |
| 6,129,185 | A | 10/2000 | Osterberg et al. | |
| 6,212,974 | B1 | 4/2001 | Van Duyn | |
| 6,293,532 | B2 | 9/2001 | McGuire | |
| 6,296,203 | B1 | 10/2001 | Manteiga et al. | |
| 6,354,576 | B1 | 3/2002 | Jacobs et al. | |
| 6,390,254 | B1 | 5/2002 | Bennett et al. | |
| 6,413,046 | B1 | 7/2002 | Penn et al. | |
| 6,415,674 | B1 | 7/2002 | Davis et al. | |
| 6,454,063 | B1 * | 9/2002 | Osterberg et al. | 188/379 |
| 6,634,472 | B1 | 10/2003 | Davis et al. | |
| 6,681,908 | B2 | 1/2004 | Davis | |
| 6,715,591 | B2 | 4/2004 | Davis | |
| 6,755,287 | B2 | 6/2004 | Hadden et al. | |
| 6,834,841 | B2 | 12/2004 | Osterberg | |
| 6,851,529 | B2 | 2/2005 | Jones et al. | |
| 6,955,250 | B2 | 10/2005 | Kreider et al. | |
| 7,012,271 | B2 | 3/2006 | Gorinevsky et al. | |
| 7,017,858 | B2 | 3/2006 | Roson et al. | |
| 7,051,617 | B2 | 5/2006 | Smith et al. | |
| 7,063,290 | B2 | 6/2006 | Marche | |
| 7,093,806 | B2 | 8/2006 | Osterberg | |
| 7,121,729 | B2 | 10/2006 | Davis et al. | |
| 7,182,188 | B2 * | 2/2007 | Ruebsamen et al. | 188/298 |
| 7,329,048 | B2 | 2/2008 | Klusman et al. | |
| 7,445,094 | B1 | 11/2008 | Henderson et al. | |
| 7,517,152 | B1 * | 4/2009 | Walsh | 384/99 |
| 7,625,121 | B2 * | 12/2009 | Pettinato et al. | 384/99 |
| 7,798,720 | B1 * | 9/2010 | Walsh | 384/99 |
| 2010/0207008 | A1 * | 8/2010 | Cottrell | 248/638 |

* cited by examiner

VIBRATION ISOLATION MOUNTING ASSEMBLY

TECHNICAL FIELD

Embodiments of the subject matter described herein relate generally to mounting assemblies. More particularly, embodiments of the subject matter relate to vibration isolation assemblies and mounting assemblies for aviation components and turbomachinery.

BACKGROUND

Vibrations caused by operating jet engines on an aircraft have a detrimental effect on both the performance of the jet engine and the comfort of those aboard the aircraft. Jet engines, particularly turbofan engines, contain a number of components which rotate about a central axis. Because vibrations can introduce eccentricity in the rotation, vibrations can degrade the performance of the engine. The reduced performance can be manifest as a decrease in thrust, which can, in turn, increase the length of a flight as well as the fuel required. The vibrations also can travel through the frame of the aircraft to compartments containing passengers and operators. While not harmful, vibrations can be an unpleasant aspect of travel for the occupants.

The most common approach to reducing the impact of vibrations on rotating turbomachinery components is to provide a squeeze film damper (SFD). Typically, a bearing rotatably supports a shaft in the engine, such as a rotor shaft. The bearing is, in turn, supported by a SFD. The SFD damps vibrations from the rotor by providing a constant flow of oil to an annular chamber surrounding the bearing. The oil film can be squeezed through one or more exit channels when the bearing moves from its central position as a result of rotor shaft eccentricity. SFDs are not ideal because they offer suboptimal damping characteristics while still requiring oil and maintenance. Additionally, the use of SFDs requires tolerancing for positioning of the rotor shaft and bearings that can introduce variations in the center of rotation of the shaft, further reducing performance. Vibrations from the jet engine causing the eccentricity can propagate to the rest of the aircraft through the structure of the aircraft.

BRIEF SUMMARY

A mounting assembly is provided. The mounting assembly comprises an outer ring having a plurality of insert portions, each of the plurality of insert portions extending toward the center of the outer ring and having an insert cavity, a plurality of vibration isolation assemblies, each of the vibration isolation assemblies disposed in one of the insert cavities, each of the plurality of vibration isolation assemblies comprising a first bellows portion and a second bellows portion, a passageway formed therein and connecting the first and second bellows portions, and a contact portion adapted to receive a force, an inner ring having a plurality of contact cavities, each contact cavity adapted to receive a contact portion from one of the plurality of vibration isolation assemblies, and a central ring coupled to the outer ring by the plurality of insert portions, and to the inner ring by a plurality of bridge portions.

Another mounting assembly is provided. The mounting assembly comprises a plurality of vibration isolation assemblies, each of the plurality of vibration isolation assemblies comprising a first bellows portion and a second bellows portion, a passageway formed therein and connecting the first and second bellows portions, a first contact portion adapted to receive a force, and a second contact portion, an inner ring adapted to surround a rod and having a plurality of contact cavities, each of the contact cavities adapted to receive a respective one of the second contact portions of one of the plurality of vibration isolation assemblies, an outer ring surrounding the inner ring, the outer ring having a plurality of receiving cavities, and a central ring disposed between the inner ring and the outer ring, wherein the central ring is coupled to the outer ring with a plurality of outer bridge portions and to the inner ring with a plurality of inner bridge portions, the central ring having a plurality of holes, a respective one of the vibration isolation assemblies disposed in each of the plurality of holes.

An aircraft engine mounting assembly is also provided. The aircraft engine mounting assembly comprises a bracket having a first fastener hole, a second fastener hole, and a receiving portion formed therein, and a vibration isolation assembly disposed in the receiving portion and coupled to the bracket. The vibration isolation assembly comprises a resilient member, a first bellows portion, a second bellows portion, a passageway formed therein and connecting the first and second bellows portions, a fluid disposed in the first bellows portion, the second bellows portion, and the passageway, and a coupling portion adapted to couple the vibration isolation assembly to an engine, wherein the vibration isolation assembly is adapted to receive a force from the engine with the coupling portion, transmit the force to the resilient member and to the first bellows portion, the first bellows portion adapted to transfer fluid through the passageway to the second bellows portion by contracting in response to receiving the force.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
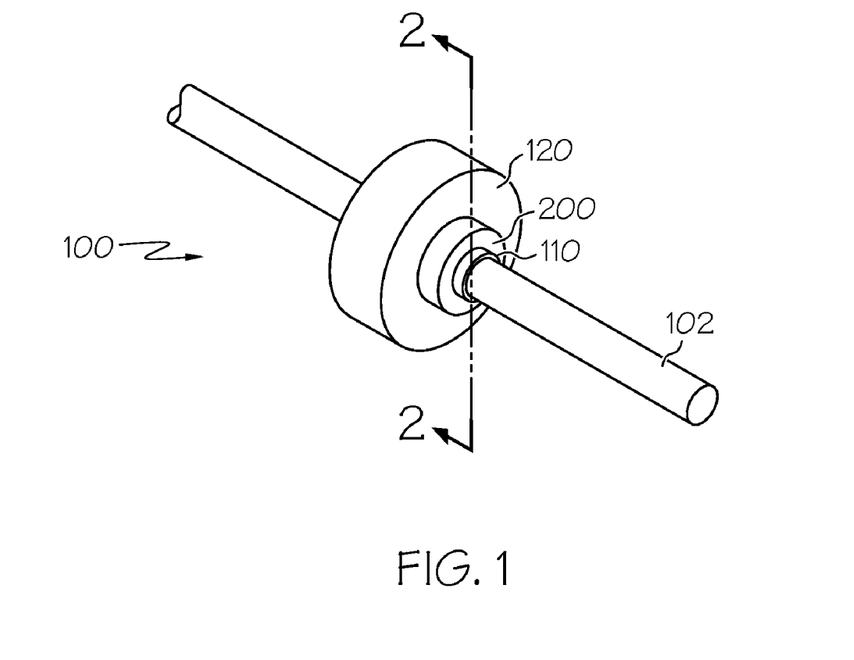
FIG. 1 is a perspective view of a rotor assembly including a rotor support assembly.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "front", "back", "rear", "side", "outer", and "inner" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

While certain features are discussed with reference to exemplary embodiments, any one of numerous other embodiments of a mounting assembly may be implemented as well. Fluid, as used in the present invention, can be any liquid or any gas known in the art. As used herein, "fastened" can include any of a variety of techniques for joining two components, such as threaded engagement, adhesion, or coupling with a fastener, such as a bolt or clasp. Additionally, other techniques can be used to accomplish the coupling without limitation. Accordingly, when reference is made to two fastened objects, it should be understood that they are coupled together through a the use of a fastening technique, whether or not the technique requires additional, unshown, components.

Vibrations in turbomachinery, such as jet engines, can be isolated through the use of an annular damping assembly. Preferably, the damping assembly contains both flexing and damping members. One such assembly can have at least one bellows member adapted to receive a fluid during displacement, and return the fluid to its original reservoir after the displacement is reduced. The self-contained fluid removes the necessity for maintenance. Additionally, by using an annular member coupled to a bearing supporting a rotor shaft, the rotor shaft can be placed in a desired location, thereby removing errors associated with tolerances for eccentricity in a squeeze film damper (SFD). Additionally, a vibration assembly such as the one described can be used in a linear embodiment to isolate the jet engine from the rest of the aircraft, thereby reducing vibrations experienced by occupants and increasing their comfort.

FIG. 1 illustrates an embodiment of a rotor assembly 100 for a jet engine. The rotor assembly 100 comprises a rotor shaft 102 rotatably supported by a bearing assembly 110, in turn supported by a vibration isolation assembly 200 and a mounting portion 120. With reference to the cross-sectional view in FIG. 2, the bearing assembly 110 comprises an inner race 112, a plurality of bearings 114, and an outer race 116. The bearing assembly 110 is supported by a vibration isolation assembly 200 and a mounting portion 120. The mounting portion 120 can be a portion of the engine surrounding the rotor assembly 100.

Figure 2:
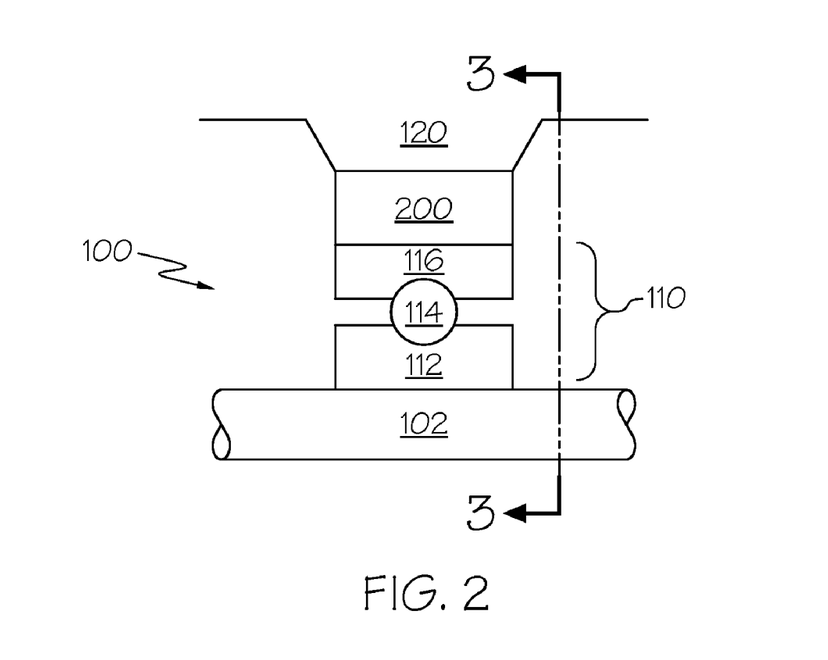
FIG. 2 is a cross-sectional view of an embodiment of the rotor support assembly of FIG. 1.

The rotor shaft 102 preferably rotates at a high rate, and the bearing assembly 110 permits coupling of the rotor shaft 102 to the mounting portion 120 while still allowing rotation of the rotor shaft 102. Preferably, the bearing assembly 110 introduces as little friction as possible, reducing drag on the rotor shaft 102. The vibration isolation assembly 200 can be an annular member which surrounds the bearing assembly 110 and is coupled to the mounting portion 120. The vibration isolation assembly 200 preferably damps vibrations between the mounting portion 120 and rotor shaft 102, inhibiting eccentricity in the rotation of the rotor shaft 102.

It should be appreciated that although the vibration isolation assembly 200 is shown in a cross-sectional view, it can be seal and/or enclosed by walls. The walls can be positioned during or after manufacture, and preferably inhibit fluid communication from without the vibration isolation assembly 200 to spaces within, and vice versa.

Figure 3:
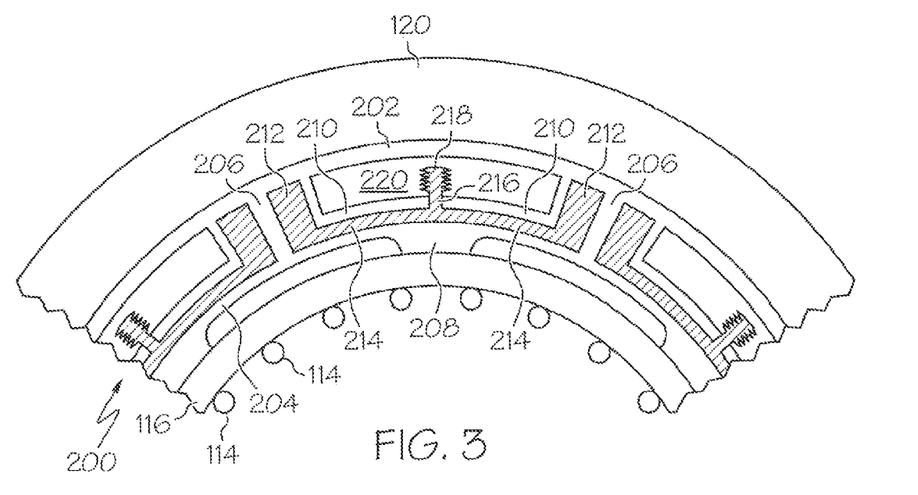
FIG. 3 is a detailed, cross-sectional view of the rotor support assembly embodiment of FIG. 1.

The vibration isolation assembly 200 preferably comprises an outer ring 202, an inner ring 204, a plurality of axial portions 206, a plurality of contact portions 208, a plurality of flanges 210, a plurality of fluid reservoirs 212, a plurality of channels 214, a plurality of passageways 216 formed by the flanges 210, a plurality of bellows portions 218, each bellows portion 218 disposed in a chamber 220. The exact number of each portion of the vibration isolation assembly 200 can vary. Because the segment between axial portions 206 comprises a self-contained damping assembly, the vibration isolation assembly 200 preferably is comprised of a series of repeating segments, which circumferentially form an annular shape. Thus, in certain embodiments, six such illustrated segments are present, disposed equally in a circle to form the annular vibration isolation assembly 200. In other embodiments, four, or seven, or eight, or twelve segments can be used, as desired, without limitation.

The outer ring 202 preferably provides a coupling and/or mounting surface for coupling the vibration isolation assembly 200 with the mounting portion 120. Accordingly, while shown smooth, it can have coupling features, such as notches, latches, threaded holes, and so on, if desired and/or appropriate. The outer ring 202 preferably provides an outer boundary for the other features of the vibration isolation assembly 200, distributing mechanical forces. For example, an outward force exerted on one of the flanges 210 is resisted by the outer ring 202 and the mounting portion 120 to which it is coupled.

The inner ring 204 preferably has a substantially circular shape, adapted to surround the outer race 116. The inner ring 204, outer ring 202, axial portions 206, contact portions, 208, and flanges 210 are preferably integrally formed. In certain embodiments, however, they can be individual components fastened together to the embodiment shown. A metal, such as aluminum, a stainless steel, titanium, or similar metal with appropriate strength and elastic properties can be used. Other materials can also be used, including composites, or ceramics, when appropriate. For example, when composed of a variety of fastened sub-components, multiple materials can be present in a single embodiment.

The inner ring 204 can be an arc portion in each segment of the assembly 200. The arc portion of the inner ring 204 in each segment can comprise a plurality of inward-extending protrusions identified as the contact portions 208. The contact portions 208 function as pads of interaction between the vibration isolation assembly 200 and the outer race 116. Thus, contact between the two components preferably occurs at the contact portions 208, as shown. Although illustrated as integral members of the inner ring 204, the contact portions 208 can be separate members fasted to the inner ring 204, or positioned with an interference fit. Also, while integrally formed with the inner ring 204, the contact portions 208 are preferably of the same material, when separate components, they can be constructed of a variety of materials, including the metals previously identified, as well as elastomeric materials, or other materials having vibration isolation characteristics.

The contact portions 208 preferably are positioned inward from the passageway 216, as shown. Each contact portion 208 is preferably disposed between two axial portions 206. In certain embodiments, more than one contact portion 208 can be disposed between two axial portions.

The axial portions 206 preferably couple, join, or connect the outer ring 202 with the inner ring 204. Thus, the axial portions 206 can be considered struts or other load-transmitting members. The axial portions 206 preferably extend in an axial direction, and though illustrated in a particular manner for exemplary purposes, can have different relative thickness than shown. The axial portions 206 each provide a boundary to a segment of the vibration isolation assembly 200, as mentioned above. The axial portions 206 enclose a cavity in the vibration isolation assembly 200. The cavity can be occupied by other structures, such as the flanges 210 and bellows portion 218, and can be further subdivided into other cavities and/or chambers. At least part of the cavity enclosed by the axial portions 206 can be filled with a fluid, as described in greater detail below.

The flanges 210, which can also be considered flange members or flange portions, preferably extend downward and across the cavity, as shown. Each flange 210 is preferably coupled to the outer ring 202 in a location proximate an axial portion 206, while still offset so as to form the fluid reservoirs 212. Each flange 210 can extend inward short of the inner ring 204, as shown. Additionally, the flange 210 can extend towards the center of the segment, towards the contact portion 208, along the inner ring 204. The flanges 210 can be straight or curved, as appropriate to the embodiment. In those embodiments where each segment of the vibration isolation assembly 200 is disposed along a large portion of the circumference of the assembly 200, curvature may be present in the flanges 210 to follow the shape of the inner ring 204.

Preferably, in an undeformed shape, the flanges 210 are cantilevered, or extended as shown, without contacting the outer ring 202, inner ring 204, axial portions 206, and/or each other. The flanges 210 are preferably formed from a material exhibiting elastic mechanical properties, such as a metal, and not a substantially brittle material.

Figure 4:
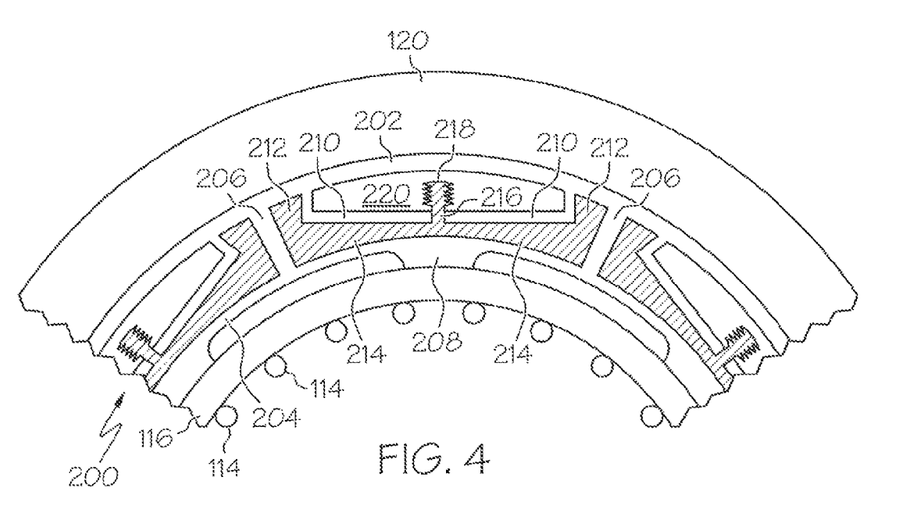
FIG. 4 is a detailed view of another embodiment of a rotor support assembly.

Although shown with an L-shape, the flanges 210 can take other shapes as well, provided they perform the functions described. For example, FIG. 4 illustrates another embodiment of the vibration isolation assembly 200. In FIG. 4, the flanges 210 extend toward the inner ring 204 at an angle, rather than extending along it. Other configurations can also be used, so long as the functions are preserved, including partially angled flanges, and so on.

With reference back to FIG. 3, the flanges 210 bound a portion of the cavity into the fluid reservoirs 212, which are also bordered by the outer ring 202, inner ring 204, and axial portions 206. Preferably, the fluid reservoirs 212, like other portions of the vibration isolation assembly 200, are air- and water-tight, inhibiting passage of a fluid from within to without, and vice versa.

Between the flanges 210 and the inner ring 204, a plurality of channels 214 are formed. The channels 214 extend from the fluid reservoirs 212, between the flanges 210 and inner ring 204, to the passageway 216. As shown, the flanges 210 preferably terminate their circumferential portions proximate each other, above the contact portion 208. Thus, the passageway 216 is a channel through which fluid can pass from the channels 214 into the bellows portion 218. The passageway 216 can be of various sizes, depending on the thickness and length of the flanges 210. The exact geometry of each passageway 216 can vary between embodiments, and even between segments in each embodiment. Preferably, the flanges 210 are appropriately sized to form a passageway 216 of desired cross-section and length.

The bellows portion 218 is preferably coupled to the passageway 216 and disposed to receive fluid through the passageway 216. The bellows portion 218 is preferably a resilient component adapted to expand and contract under pressure. The bellows portion 218 can expand from an undeformed state when fluid is introduced into it, such as through the passageway 218. Subsequently, the bellows portion 218 can be adapted to contract to its undeformed shape, ejecting fluid back into the passageway 218. Thus, the bellows portion 218 need not be an actual bellows, but can be any resiliently expandable component which is biased to return to an undeformed shape. Preferably, the bellows portion 218 is composed of an elastomeric material.

The bellows portion 218 is preferably located above the contact portion 208 in the chamber 220 formed by the outer ring 202 and the flanges 210. The bellows portion 218 is preferably unimpeded to expand within the chamber 220. The bellows portion 218 can further comprise a seal. The seal can inhibit fluid from passing out of the channels 214 and/or passageway 216 past the bellows portion 218 and into the channel 220. The seal can be a component, such as a retention member constricting the bellows portion 218 to the passageway 216, or a sealant, such as an adhesive affixing the bellows portion 218 to the flanges 210.

A fluid is preferably disposed within the fluid reservoirs 212, channels 214, passageway 216, and bellows portion 218. The fluid can be any viscous liquid or gas with appropriate damping properties. Some fluids can have a silicone base, while others can have a petroleum base. The fluid is preferably incompressible or substantially incompressible.

During operation of the rotor, displacement of the rotor shaft 102 can occur, which can cause it to move eccentrically. Consequently, the bearing assembly 110 will receive and transmit forces to the vibration isolation assembly 200 in the direction to which the rotor shaft 102 is moving. The vibration isolation assembly 200 will preferably receive the force at the contact portion 208, sometimes with multiple contact portions 208. The contact portion 208 will then deflect outward, causing the inner ring 204 to also deflect outward. The arc portion of the inner ring 204 to which the contact portion 208 is coupled will thus deflect outward into the channels 214.

The fluid in the channels 214, being at least substantially incompressible, will travel through the passageway 216 into the bellows portion 218. The bellows portion 218 can expand to receive the fluid displacement caused by deflection of the arc portion of the inner ring 204. In so doing, the vibration isolation assembly 200 can receive the vibratory force from the rotor shaft 102 and damp it, inhibiting transmission of the vibratory force to the mounting portion 120.

After the rotor shaft 102 returns to its undisplaced location, the inner ring 204 preferably returns to its undeflected shape. Accordingly, the fluid displaced by the deflection can return to the channels 214 and/or fluid reservoirs 212. Contraction of the bellows member 218 returning to its undeformed shape preferably expels fluid into the passageway 216. Accordingly, no fluid is lost from the assembly 200, and no maintenance or re-introduction or expulsion of fluid is needed.

Under low-frequency vibrations of the shaft 102, fluid will pass through the passageway 216 and into the bellows member 218 sufficiently slowly to provide damping. As the frequency of vibratory forces imparted by the shaft 102 increases, the amount of fluid which can travel into the bellows member 218 between refractory periods decreases. Accordingly, the fluid begins to act as a member with a stiffness that increases during increased vibrations. The flanges 210 will receive an increase amount of force, transmitted through the fluid. The flanges 210 can act as resilient members or springs, by deflecting outward toward the outer ring 202 to absorb the force. After a certain threshold vibration frequency, fluid can transmit all or substantially all of the received vibratory force to the flanges 210. The exact rate of stiffening and force transmission can be configured, designed, or tuned to individual embodiments. Such factors as the viscosity of the fluid, the stiffness of the bellows member 218, and the cross-sectional area of the passageway 216 can all affect the vibration response, and each can be varied according to the desired performance of an embodiment. Accordingly, the vibration isolation assembly 200 operates in two responsive modes, both damping low-frequency vibrations from the rotor shaft 102 with fluid transfer to the bellows member, as well as resisting high-frequency vibrations with the resilient flanges 210.

Figure 5:
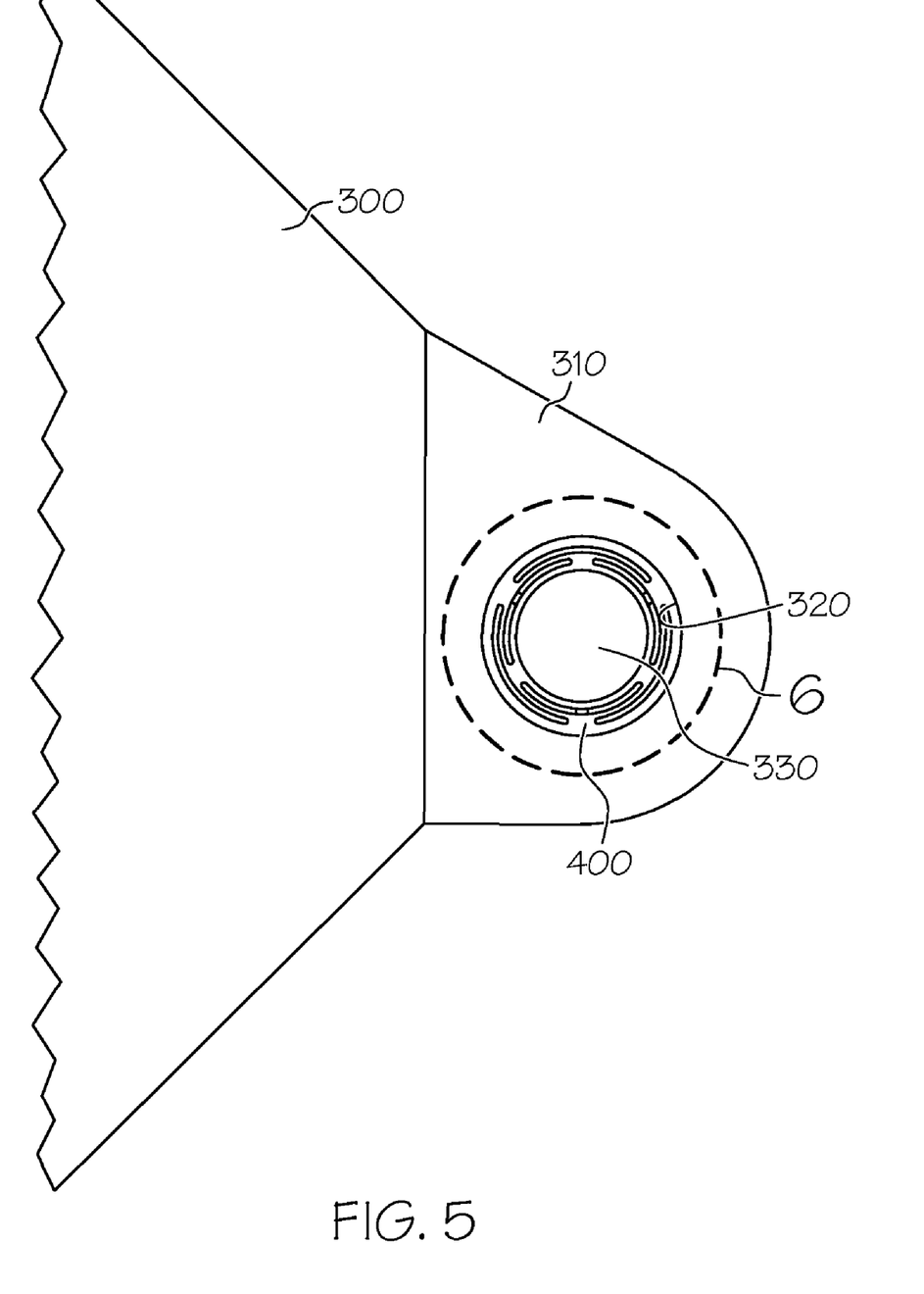
FIG. 5 is a view of an annular mounting assembly.
Figure 6:
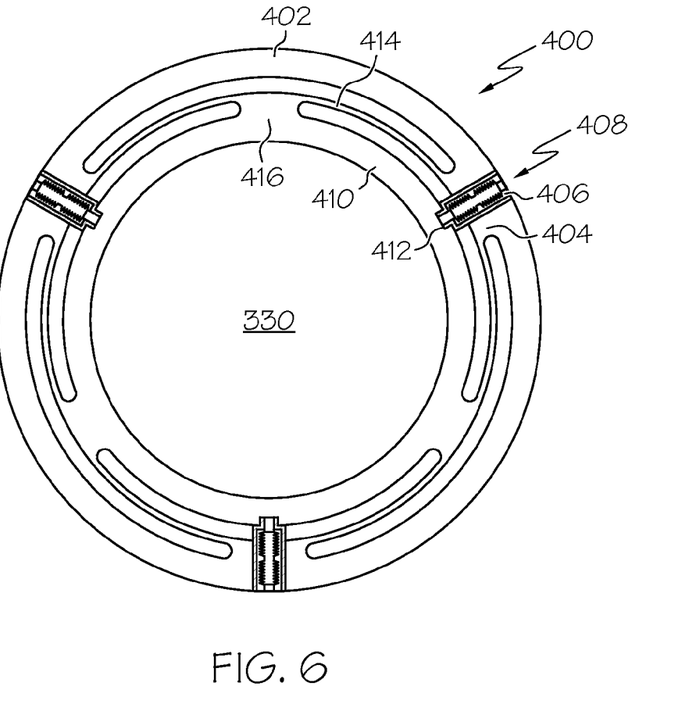
FIG. 6 is a detailed cross-sectional view of an embodiment of an annular vibration isolation assembly of the annular mounting assembly of FIG. 5.
Figure 7:
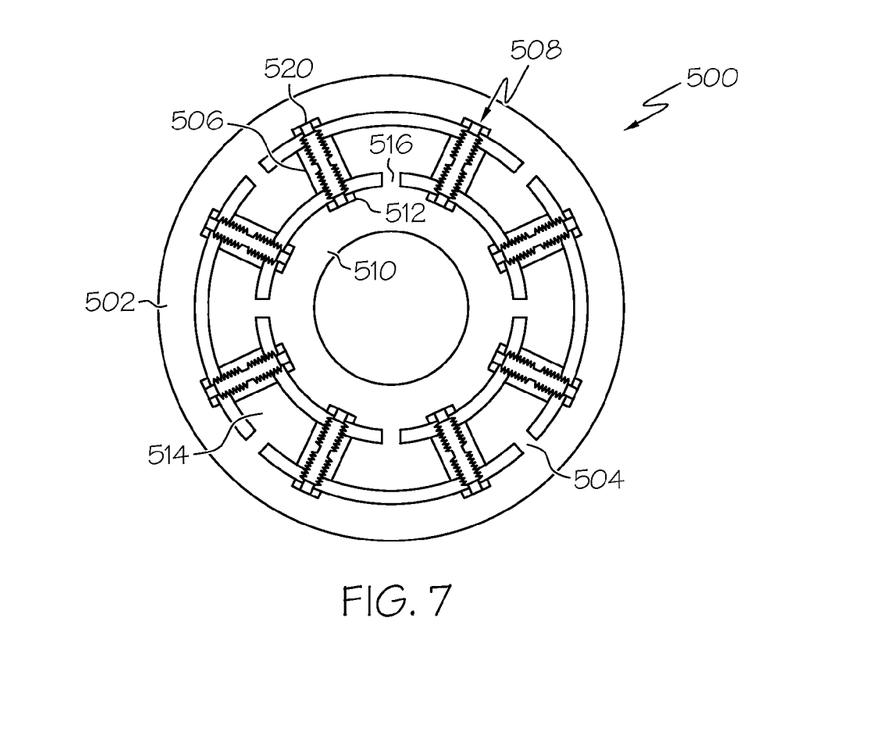
FIG. 7 is a cross-sectional view of another embodiment of an annular vibration isolation assembly.

Additional embodiments of a vibration isolation assembly 200 are shown in FIGS. 6 and 7. Although disclosed in the context of a rotor shaft 102 in a turbomachine, it should be understood that any vibratory force exerted by a shaft can be damped using the assembly 200. For example, a mounting assembly can retain a rod, bolt, or shaft from one component into a bracket of another. By surrounding the rod, bolt, shaft, or other cylindrical mechanism with an assembly 200, the vibration isolation assembly 200 can inhibit transmission of vibration through the mount assembly. One arrangement of such components is shown in FIG. 5. As shown in FIG. 5, a base 300 can have a coupling portion 310 with a hole 320. The hole 320 can be sufficiently sized to receive the mounting assembly 400. The cylindrical member to be coupled to the base 300 can be received by the mounting assembly 400 at a central passage 330.

FIG. 6 illustrates a detailed, cross-sectional view of mounting assembly 400. The mounting assembly 400 has an outer ring 402, an inner ring 410, and a central ring 414. The rings 402, 410, 414 can be composed similar to those described above, with respect to materials and integral formation or fastened components. The rings 402, 410, 414 are preferably formed with gaps or voids between each ring, permitting radial flexure by elastic bending of the rings 402, 410, 414. Each ring 402, 410, 414 is preferably coupled to one or more of the others, however, to form a solid component.

The outer ring 402 can comprise a plurality of insert portions 404. The insert portions 404 preferably extend between the outer ring 402 and the central ring 414. Each insert portion 404 can be an integrally-formed component, or a fastened or affixed member. The insert portions 404 preferably couple the outer ring 402 to the central ring 414, inhibiting relative movement therebetween. Preferably, the insert portions 404 are evenly spaced around the circumference of the mounting assembly 400. For example, as in the case of the embodiment illustrated in FIG. 6, where three insert portions 404 are present, they can be 120° apart around the outer and central rings 402, 414. Where four are present, they can be spaced 90° apart and so on.

Each insert portion 404 preferably comprises an insert cavity 406. The insert cavities 406 can be voids or spaces formed during shaping of the assembly 400, or can be excavated later, such as by drilling. Preferably, the insert cavities 406 are each appropriately sized and shaped to receive a vibration isolation assembly 408, described in greater detail below. The number of insert portions 404 disposed circumferentially around the outer ring 402 can vary between embodiments. Preferably, there are an equal number of insert portions 404 and bridge portions 416. The insert portions 404 can be located across the center of the mounting assembly 400 from the bridge portions 416 in those embodiments having even numbers of each.

The bridge portions 416 preferably extend between the central ring 414 and the inner ring 410. The bridge portions 416 can be protrusions or struts coupling the inner ring 410 to the central ring 414. Accordingly, each ring 402, 410, 414 is coupled to each other ring 402, 410, 414 forming a single unit. Although coupled together by portions of the mounting assembly 400 having stiffness, deflection of the rings can still occur when experiencing vibratory forces, resulting in, for example, the inner ring 410 offset from its undeflected position. Consequently, while all rings 402, 410, 414 are illustrated surrounding a common center point, under loads, one or more rings 402, 410, 414 can be offset, relative to the others.

The inner ring 410 preferably is sized to accommodate shafts and other cylindrical components on its interior surface. The inner ring 410 has a plurality of contact cavities 412 sized and shaped to receive a contact portion of a vibration isolation assembly 408. The contact cavity 412 can be smooth or threaded, as appropriate for the embodiment. Each contact cavity 412 is preferably positioned in a radial line with each insert portion 404, and aligned with the insert cavity 406.

The vibration isolation assembly 408 is described in detail below with respect to FIGS. 7-9. Each vibration isolation assembly 408, however, preferably includes first and second bellows portions, a passageway therebetween, and a contact portion. A vibration isolation assembly 408 can be aligned to extend its contact portion into a contact cavity 412. A vibration isolation assembly 408 can be coupled to an insert cavity 406 using any suitable technique, including fasteners, a threaded engagement, an adhesive, or any other fastening approach, as described above.

The number of vibration isolation assemblies 408 can vary between embodiments, as shown with the arrangement in FIG. 7. With reference to FIG. 7, the component numbers have been incremented by 100, but otherwise are substantially similar to previously described components. FIG. 7 illustrates another embodiment of a mounting assembly 500.

One difference between the embodiments of FIG. 6 and FIG. 7 is in the number and placement of vibration isolation assemblies 408, 508. In embodiment of FIG. 6, the vibration isolation assemblies 408 are disposed in the insert cavities 406 which extend from the outer ring 402 to the central ring 414, whereas in the embodiment of FIG. 7, the insert cavities 506, are located substantially in the central ring 514 and are sized and shaped to receive the vibration isolation assembly 508 there. A secondary insert cavity 520 is also located in the outer ring 502, where the vibration isolation assembly 508 contacts the outer ring 502. Preferably, the vibration isolation assembly 508 is coupled to the outer ring 502 in the secondary insert cavity 520 and to the central ring 514 in the insert cavity 506. Thus, the vibration isolation assembly 508 extends from the insert cavity 506 to the contact cavity 512 through an insert cavity 506 in the central ring 514.

The exact number and location of vibration isolation assemblies 408, 508, whether three or eight, or another number, is not limited. Certain embodiments can have more or fewer than the illustrated embodiments, and it is contemplated that the insert cavities and any secondary or tertiary cavities and contact cavities will be positioned to accommodate the vibration isolation assemblies as appropriate. Preferably, the connecting or coupling portions or components between the outer and central rings is offset from the central and inner rings.

Reference is made again to FIG. 6, although the functional features are present in a multitude of embodiments, as will become apparent to a skilled practitioner in the art. When the shaft within the inner ring 410 vibrates, it will exert an outward force on a portion of the inner ring 410. The inner ring 410 can deflect outwards, and preferably the outward deflection is resisted not only by the inherent mechanical properties of the inner ring 410, but also by the vibration isolation assemblies 408, which receive the force at the contact portion coupled to the contact cavity 412.

The vibration isolation assemblies 408 can damp and thereby reduce the deflection of the inner ring 410. The vibration isolation assemblies 408 preferably act as dampers by transferring a fluid between two internal bellows portions through a restricted passageway, as explained in greater detail below. Additionally, one or more of the bellows portions can expand outward, circumferentially. Regardless of the cross-sectional shape, the bellows portions can have a stiffness resisting expansion. In addition to the damping effect provided by transferring a fluid through the internal, restricted passageway, the bellows members can provide stiffness by resisting circumferential expansion. Accordingly, vibratory motion is reduced, and the mounting assembly 400 can isolate the cylindrical central shaft from the surrounding mounting bracket or receiver.

Figure 8:
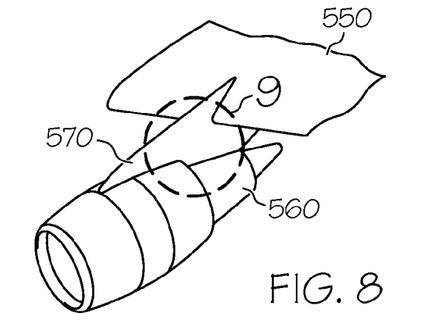
FIG. 8 is a perspective view of an aircraft engine coupling assembly for an aircraft.
Figure 9:
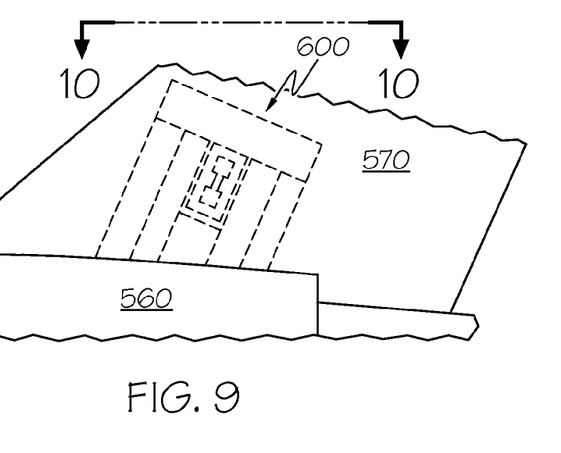
FIG. 9 is a detailed view of the coupling assembly of FIG. 8.

FIG. 8 illustrates another coupling or mounting assembly which benefits from vibration isolation. In the embodiment shown in FIG. 8, an aircraft wing 550 is coupled to an aircraft engine 560 by a pylon 570. The pylon 570 can comprise a mounting assembly 600, as shown in the detailed view of FIG. 9. The pylon 570 can further comprise a yoke 630 for coupling with the mounting assembly 600.

Figure 10:
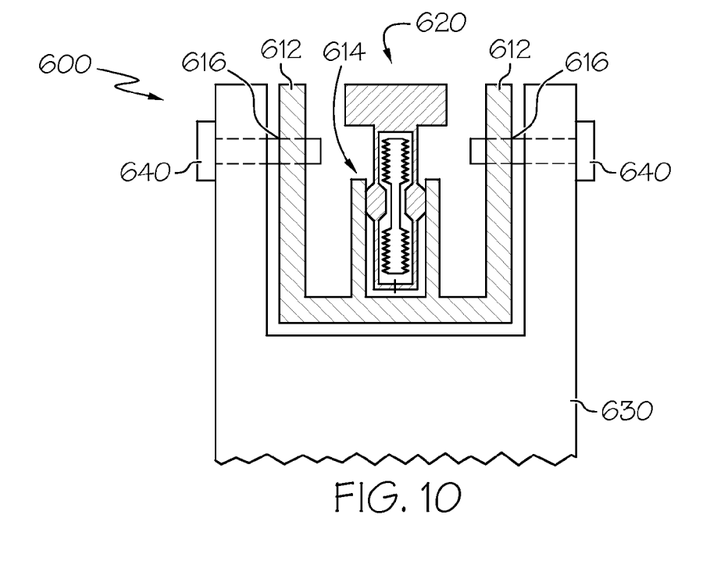
FIG. 10 is a cross-sectional view of an embodiment of the coupling assembly of FIG. 9.

FIG. 10 illustrates a detailed, cross-sectional view of the mounting assembly 600. The mounting assembly 600 comprises a bracket 610 with at least two bolting lengths 612 and a receiving portion 614. A vibration isolation assembly 620 can be positioned in the receiving portion 614. The bracket 610 can couple to a yoke 630, such as a component of an aircraft airframe by one or more bolts 640 extending through bolt holes 616 in the bracket 610. If a vibrating component, such as a jet engine, is coupled to the vibration isolation assembly 620, the mounting assembly 600 can inhibit vibrations from travelling to the airframe through the yoke, thereby increasing the comfort of occupants of the aircraft.

Figure 11:
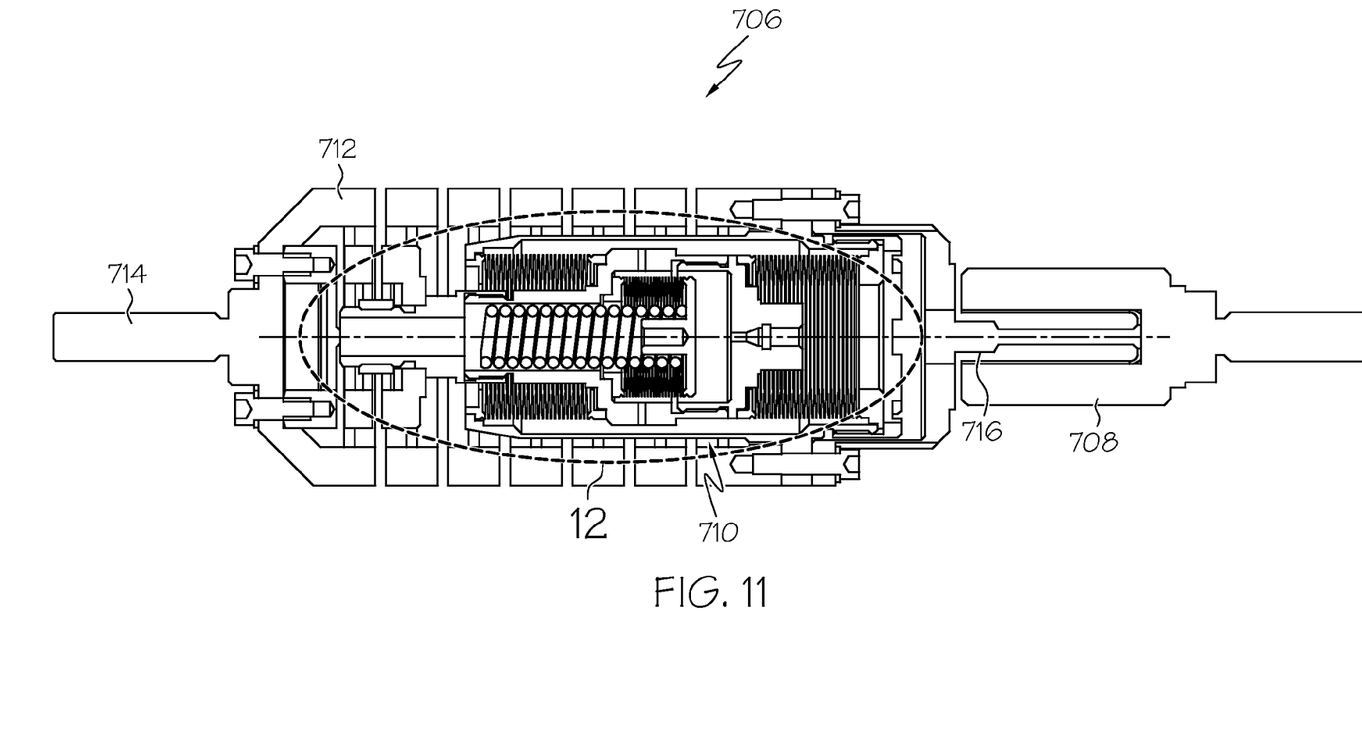
FIG. 11 is a cross-sectional view of an embodiment of a vibration isolation assembly.
Figure 12:
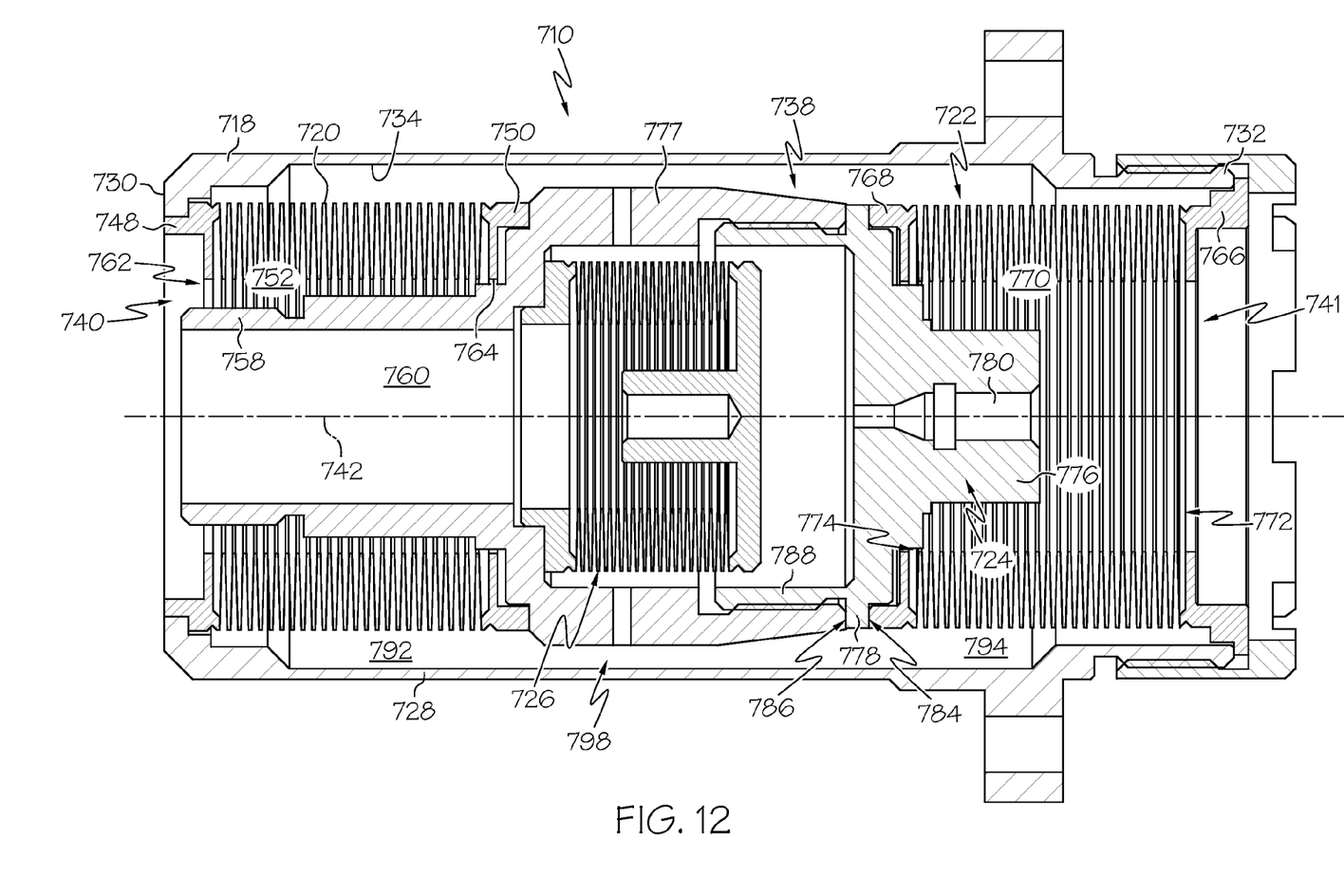
FIG. 12 is a detailed view of the vibration isolation assembly of FIG. 11.
Figure 13:
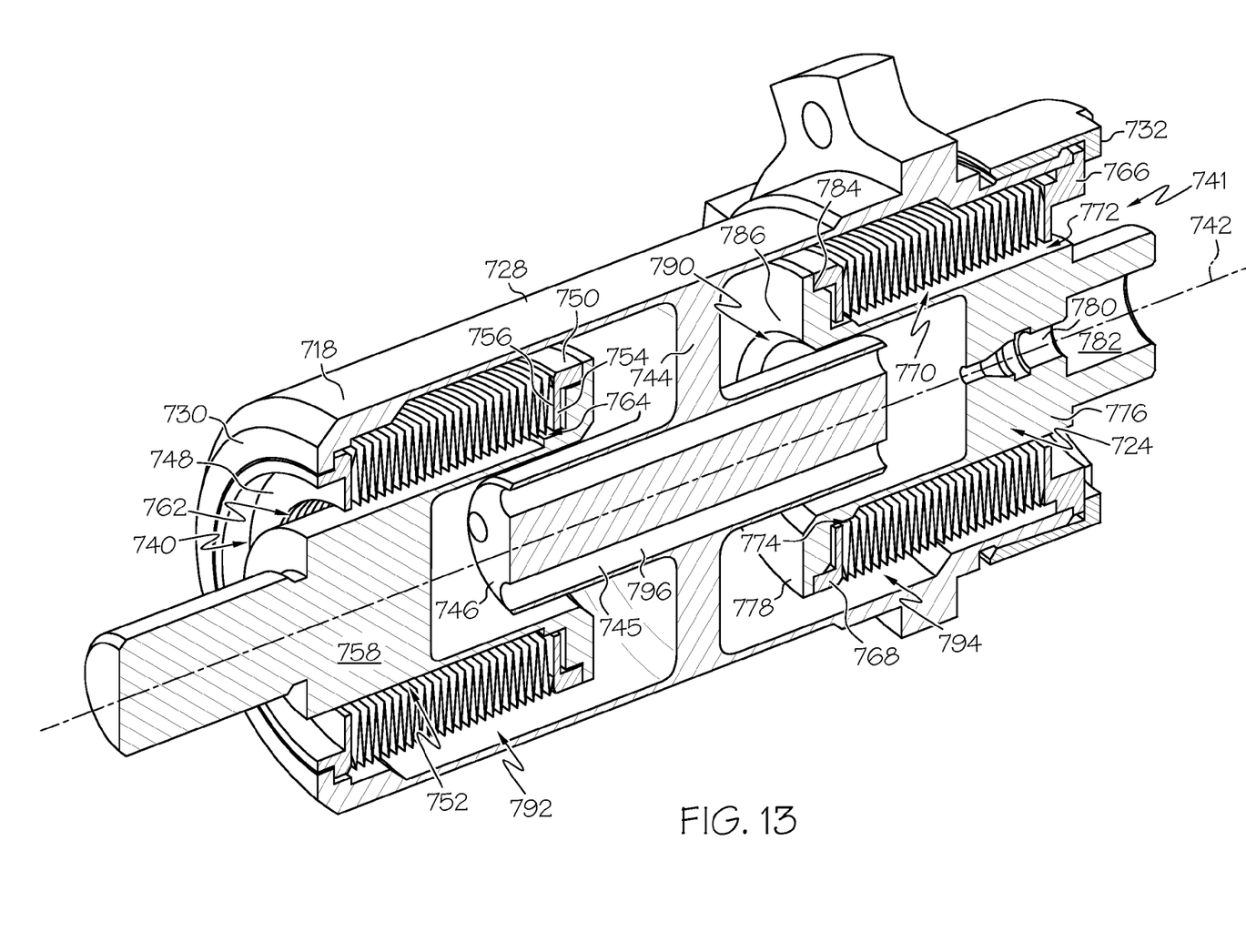
FIG. 13 is a cross-sectional view of another embodiment of a vibration isolation assembly.

FIGS. 11-13 illustrate two embodiments of the vibration isolation assemblies of FIGS. 5-10. The vibration isolation assembly is described as a vibration isolation apparatus 706. The vibration isolation apparatus 706 dampens and isolates vibration that may be experienced by the components mounted to it, such as in the previously-described mounting assemblies. Although a single vibration isolation apparatus 706 is described, as previously described, it may be preferable to employ more than one vibration isolation apparatus 706.

With reference now to FIG. 11, one exemplary vibration isolation apparatus 706 is provided. The vibration isolation apparatus 706 includes a pivot 708, an isolation assembly 710, an outer housing 712, and a support 714. The pivot 708 receives vibratory motion from a component to which it is coupled. The pivot 708 can also be considered a contact portion insofar as it contacts the vibrating component and/or component deflecting in response to the vibrations. The pivot 708 can be used to couple to vibrating components, such as a jet engine for use in the mounting assembly of FIGS. 8-10. The isolation assembly 710 damps and isolates the received vibratory motion and is coupled to the pivot 708 via a pivot 716. The outer housing 712 protects the isolation assembly 710 from damage and is configured to house the isolation assembly 710 therein. The support 714 attaches the vibration isolation apparatus 106 to another component, such as the outer ring cavity insert of FIG. 6 or 7. The support 714 can also be used to couple to components such as the receiving portion 614 of FIGS. 8-10. The support 714 may be either integrally formed as part of the outer housing 712 or may be a separate piece coupled to the outer housing 712. Although the support 714 is illustrated as being on an opposite end of the isolation assembly 710 from the pivot 708, it will be appreciated that the support 714 may be formed on or coupled to any suitable part of the isolation assembly 710.

Turning now to FIG. 12, a cross section view of an exemplary isolation assembly 710 is depicted. The isolation assembly 710 includes an assembly housing 718, a first bellows 720, a second bellows 722, a piston assembly 724, fluid and, optionally, a temperature compensation device 726. The assembly housing 718 is configured to operate with the other components of the isolation assembly 710 to provide a fixed volume of space and to enclose and seal the fluid therein. The assembly housing 718 includes at least a tube 728 that has a first end 730, a second end 732, and an inner surface 734 that defines a passage 738 extending between the first and second ends 730, 732. The assembly housing 718 also includes a longitudinal axis 742 along which the components in the passage 738 may travel. Preferably, the first end 730 includes an inlet 740, the second end 732 includes an outlet 741, and the tube 728 has no openings other than the inlet 740 and outlet 741. However, in alternate embodiments, the tube 728 may be a single component having endwalls integrally formed or coupled to each of the first and second ends 730, 732.

In one exemplary embodiment, such as illustrated in FIG. 13, the assembly housing 718 includes a damping plate 744 disposed in the middle thereof. The damping plate 744 is integrally formed or integrated as part of the assembly housing 718 and includes at least one duct 745 that extends through the damping plate 744. The damping plate 744 can include a pipe 746 that extends axially outward from substantially the center of each side of the damping plate 744 along the longitudinal axis 742. In such an embodiment, the ducts 745 also extend through the pipe 746.

Returning to FIG. 12, the first bellows 720 is disposed within the assembly housing 718 and is preferably configured to move along the longitudinal axis 742. The first bellows 720 is coupled at one end to a first end plate 748 and at an opposite end to a second end plate 750 to thereby define first bellows interior cavity 752 therebetween. The first end plate 748 sealingly mates with the assembly housing first end 730 and couples the first bellows 720 thereto. The second end plate 750 couples to a support shaft 758 that is disposed within the first bellows interior cavity 752.

The support shaft 758 is configured to provide structural support for the first bellows 720 and guides the first bellows 720 along the longitudinal axis 742 during operation. The support shaft 758 may itself include a cavity 760 configured to receive other isolation assembly 710 components therein. It will be appreciated that each of the first and second end plates 748, 750 include openings 762, 764 formed therein that are configured to accommodate components that may extend outside of the assembly housing 718, such as the temperature compensation device 726, shown in FIG. 12, the damping plate pipe 746, illustrated in FIG. 13, or support shaft 758.

Similar to the first bellows 720, the second bellows 722 is disposed within the assembly housing 718, is coupled to a first and a second end plate 766, 768, and is preferably configured to move along the longitudinal axis 742. Although depicted in FIG. 12 as being capable of traveling along the same axis 742 as the first bellows 720, it will be appreciated that in other non-illustrated embodiments the second bellows 722 may move along any other suitable axis. The second bellows first end plate 766 sealingly mates with the assembly housing second end 732 and couples the second bellows 722 thereto. The second bellows second end plate 768 is coupled to the opposite end of the second bellows 722 and, together with the first end plate 766 and inner surface of the second bellows 722, defines a interior cavity 770. Just as above, each of the first and second end plates 766, 768 include openings 772, 774 formed therein that are configured to provide space for disposal of components that may extend outside of the assembly housing 718, in this case, the piston assembly 724 or pivot 716 (shown in FIG. 11).

The piston assembly 724 is configured to operate with the first and second bellows 720, 722 to damp and isolate vibration received from the pivot 716 (shown in FIG. 11). The piston assembly 724 is disposed within the assembly housing 718 and is coupled between the first and second bellows 720, 722. The piston assembly 724 includes a piston shaft 776 and piston flange 778. The piston shaft 776 may be a single or multiple pieces (for example, shaft 776 and section 777, as shown in FIG. 12) and is aligned along the longitudinal axis 742 and is disposed in the second bellows interior cavity 770. The piston shaft 776 has an end that is coupled to the pivot 716 and another end that is coupled to the piston flange 778. In one exemplary embodiment, the piston shaft 776 extends through the second end plate opening 174 of the second bellows 722 and is coupled directly to the pivot 716. It will be appreciated, however, that the piston shaft 776 may be coupled to the pivot 716 in any other suitable manner to receive vibratory motion therefrom.

The piston shaft 776 includes a flowpath 780 extending at least partially therethrough for receiving fluid. In one exemplary embodiment, one section of the flowpath 780 has threaded walls that are configured to mate with a set screw. In embodiments in which the damping plate pipe 744 is employed, such as in FIG. 13, the piston shaft 776 includes an alcove 782. The alcove 782 fluidly communicates with the flowpath 780 and is configured to receive the damping plate pipe 744.

The piston flange 778 extends radially outward from the piston shaft 776 and may be either formed integrally as part of the piston shaft 776 or may be separately constructed and subsequently attached to the piston shaft 776. The piston flange 778 includes a inner surface 784 and an outer surface 786. The inner surface 784 is sealingly coupled to the second bellows second end plate 768. The outer surface 786 may have any one of numerous configurations. However, in the embodiment shown in FIG. 12, the outer surface 786 is coupled to the first bellows 720 via another section of the piston 777. As such, the outer surface 786 includes an extension 788 that mates with the piston section 777. The piston section 777, in turn, is coupled to the first bellows second end plate 750. In another exemplary embodiment, the outer surface 786 is configured to couple to the first bellows 720 and the outer surface 786 is directly coupled to the first bellows second end plate 750. In still another exemplary embodiment, the outer surface 786 is not coupled to the first bellows 720. Instead, as shown in FIG. 13, the piston flange 778 includes an opening 790 formed therethrough that fluidly communicates with the alcove 782. In embodiments in which the damping plate 744 is included and the ducts 745 are formed in the damping plate pipe 746, both the piston flange opening 790 and alcove 782 are configured to accommodate the damping plate pipe 746.

As briefly mentioned previously, the isolator assembly 710 components are preferably configured to operate together to sealingly enclose the fluid therein in a fixed volume of space. The volume of space is separated into subvolumes, each of which is disposed in a first chamber 792, a second chamber 794, and a restrictive flow passage 796. The first chamber 792 is defined by a portion of the assembly housing inner surface 734 and an outer surface of the first bellows 720, and the second chamber 794 is defined by another portion of the assembly housing inner surface 734 and an outer surface of the second bellows 722. In another exemplary embodiment, such as shown in FIG. 13, the second chamber 794 is defined by a portion of the assembly housing inner surface 734, an outer surface of the second bellows 722, and the piston assembly alcove 782. The restrictive flow passage 798 allows the first and second chambers 792, 794 to communication with one another and may have any one of numerous configurations. In one exemplary embodiment, a damping annulus 796, defined by the piston flange 778 and assembly housing inner surface 734, acts as the restrictive flow passage. In another exemplary embodiment, the restrictive flow passage 796 is defined by the ducts 745 that are formed in the damping plate pipe 746, as shown in FIG. 13. In still another embodiment, the restrictive flow passage 796 is defined by ducts 745 formed in the damping plate 744. No matter the particular configuration, the first chamber 792, second chamber 794, and restrictive flow passage(s) 798 are filled with fluid. Thus, during the operation of the isolation assembly 710, when a force is exerted on the piston assembly 724, fluid is pushed from the second chamber 794, through the restrictive flow passage 798, into the first chamber 792.

As illustrated in FIG. 12, the temperature compensation device 726 may be included in the isolation assembly 710 to compensate for fluid expansion and/or contraction in response to temperature changes. The temperature compensation device 726 may have any one of numerous suitable configurations and may be disposed within the isolation assembly 710 in any one of numerous manners.

During operation, the vibration isolation assembly 710 is capable of transmitting fluid pressure from its moving piston to the sealed bellows outer surfaces. Additionally, the vibration isolator is capable of withstanding high damping forces in conjunction with the use of a small bellows cross sectional area. In some embodiments, the components of the vibration isolator are located in the bellows interior cavities, thereby allowing the overall length of the vibration isolator to be shorter than conventional vibration isolators. The isolator may still be able to effectively dampen a structure while having a smaller overall diameter than conventional isolators because its damping capabilities are not limited by its sealed bellows cross-sectional area and/or the restrictive passage through which fluid flows may be lengthened to any suitable length.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A mounting assembly comprising:
   an outer ring having a plurality of insert portions, each of the plurality of insert portions extending toward the center of the outer ring and having an insert cavity;
   a plurality of vibration isolation assemblies, each of the vibration isolation assemblies disposed in one of the insert cavities, and each of the plurality of vibration isolation assemblies comprising:
   a first bellows portion and a second bellows portion;
   a passageway formed therein and connecting the first and second bellows portions; and
   a contact portion adapted to receive a force;
   an inner ring having a plurality of contact cavities, each contact cavity adapted to receive a contact portion from one of the plurality of vibration isolation assemblies; and
   a central ring coupled to the outer ring by the plurality of insert portions, and to the inner ring by a plurality of bridge portions.

2. The mounting assembly of claim 1, wherein each of the plurality of insert portions is located across the inner ring from each of the plurality of bridge portions.

3. The mounting assembly of claim 1, wherein the outer ring has three insert portions.

4. The mounting assembly of claim 3, wherein the three insert portions are disposed 120° apart around the outer ring.

5. The mounting assembly of claim 1, wherein the central ring is coupled to the inner ring by three bridge portions.

6. The mounting assembly of claim 1, wherein each of the plurality of vibration isolation assemblies extends radially through the central ring.

7. The mounting assembly of claim 1, further comprising a plurality of extension rods, each having a respective first end, wherein each of the plurality of extension rods extends through the central ring, each of the first ends disposed in a respective one of each of the plurality of contact cavities, each of the plurality of extension rods coupling a respective one of the plurality of vibration isolation assemblies to the respective one of each of the plurality of contact cavities.

8. The mounting assembly of claim 1, wherein each insert cavity extends through the central ring and each vibration isolation assembly couples the one of the plurality of insert portions in which it is disposed to the inner ring.

9. A mounting assembly comprising:
   a plurality of vibration isolation assemblies, each of the plurality of vibration isolation assemblies comprising:
   a first bellows portion and a second bellows portion;
   a passageway formed therein and connecting the first and second bellows portions;
   a first contact portion adapted to receive a force; and
   a second contact portion;
   an inner ring adapted to surround a rod and having a plurality of contact cavities, each of the contact cavities adapted to receive a respective one of the second contact portions of one of the plurality of vibration isolation assemblies;
   an outer ring surrounding the inner ring, the outer ring having a plurality of receiving cavities; and
   a central ring disposed between the inner ring and the outer ring, wherein the central ring is coupled to the outer ring with a plurality of outer bridge portions and to the inner ring with a plurality of inner bridge portions, the central ring having a plurality of holes, a respective one of the vibration isolation assemblies disposed in each of the plurality of holes.

10. The mounting assembly of claim 9, wherein each of the plurality of second contact portions comprises a threaded portion, and each of the plurality of receiving cavities comprises a threaded surface.

11. The mounting assembly of claim 9, wherein each of the plurality of first contact portions comprises a threaded portion and each of the plurality of contact cavities comprises a threaded surface.

12. The mounting assembly of claim 9, wherein each of the plurality of inner bridge portions is circumferentially offset from each of the plurality of outer bridge portions.

13. The mounting assembly of claim 12, wherein the central ring includes four inner bridge portions and four outer bridge portions.

14. The mounting assembly of claim 13, wherein each inner bridge portion is spaced 45° circumferentially from each outer bridge portion.

15. The mounting assembly of claim 9, wherein each of the first and second bellows portions comprises a resilient member adapted to return to an undeformed position.

* * * * *